United States Patent [19]
Gaw, Jr. et al.

[11] Patent Number: 5,899,022
[45] Date of Patent: May 4, 1999

[54] AUTOMOTIVE VEHICLE DOOR INTERIOR WINDOW SEAL

[75] Inventors: William Dale Gaw, Jr., Troy; Matthew Hugo Pietila, Milford, both of Mich.

[73] Assignee: Ford Motor Company, Dearborn, Mich.

[21] Appl. No.: 09/105,103

[22] Filed: Jun. 25, 1998

[51] Int. Cl.⁶ .................................................. E05F 11/38
[52] U.S. Cl. ............................................. 49/377; 49/490.1
[58] Field of Search .............................. 49/377, 375, 502, 49/490.1, 475.1; 296/146.1, 146.7

[56] References Cited

U.S. PATENT DOCUMENTS

| | | |
|---|---|---|
| 2,899,721 | 8/1959 | Herman . |
| 3,002,783 | 10/1961 | Hofmeister . |
| 3,883,993 | 5/1975 | Pullan . |
| 4,702,039 | 10/1987 | Bocchinfuso . |
| 4,813,184 | 3/1989 | Weimar . |
| 4,819,382 | 4/1989 | Suzuki et al. . |
| 4,843,759 | 7/1989 | Kisanuki et al. . |
| 4,949,507 | 8/1990 | Vaughan ................................ 49/377 X |
| 4,969,303 | 11/1990 | Emmons . |
| 5,072,546 | 12/1991 | Ogawa . |
| 5,085,005 | 2/1992 | Yasukawa et al. ....................... 49/377 |
| 5,566,954 | 10/1996 | Hahn . |
| 5,618,608 | 4/1997 | Teishi . |
| 5,622,008 | 4/1997 | King . |
| 5,732,509 | 3/1998 | Buehler et al. ..................... 49/490.1 X |

FOREIGN PATENT DOCUMENTS

| | | |
|---|---|---|
| 001116983 | 11/1961 | Germany . |
| 1102086 | 2/1968 | Germany . |
| 000622038 | 4/1949 | United Kingdom . |
| 001095178 | 12/1967 | United Kingdom . |
| 2 172 640 | 9/1986 | United Kingdom . |

*Primary Examiner*—Jerry Redman
*Attorney, Agent, or Firm*—Steven A. Maynard

[57] ABSTRACT

An interior window seal includes an interior window seal having a pair of substantially parallel trim panel fingers adapted to receive a trim panel therebetween and a pair of substantially parallel flange fingers adapted to receive an inner door panel flange therebetween, the flange fingers adapted to rotate between a flange non-contacting position and a flange contacting position, thereby allowing for longitudinal movement of the seal relative to the flange when in the non-contacting position and preventing movement of the seal relative to the flange when in the contacting position.

2 Claims, 2 Drawing Sheets

5,899,022

AUTOMOTIVE VEHICLE DOOR INTERIOR WINDOW SEAL

FIELD OF THE INVENTION

The present invention relates to automotive vehicle door seals in general, and more specifically to vehicle door interior window seals.

BACKGROUND OF THE INVENTION

Door seals, and in particular door interior window seals for attaching to a door window opening in an automotive vehicle, must perform many functions. Primarily this includes prevention of various contaminants such as moisture, dirt and debris from getting into the door interior. The seal must also prevent noise such as road, engine, and wind noise from penetrating into the passenger compartment. Additionally, the seal determines the quality of the fit between a vehicle door interior trim panel, inner door panel and side window. A good fit affects window opening and closing characteristics, as well as window rattle and seal appearance, important elements in customer perception of vehicle quality.

To accomplish these functions effectively, a seal must not only be designed to properly interact with the vehicle door interior trim panel, the inner door panel and side window, but must also be easily attached to the flange of the inner door panel while being difficult to remove. Low seal attachment effort is necessary to expedite vehicle assembly, while seal extraction effort must be high to provide seal retention and to prevent seal disengagement during window usage. Low seal attachment effort is particularly important when attaching door interior window seals because of the importance of proper alignment of the seal with respect to the inner door panel. More specifically, during vehicle assembly the seal is first attached to the interior trim panel and then both the interior trim panel and seal are attached to the inner door panel via the seal. The seal must be manipulated longitudinally of the vehicle to insure proper alignment of the interior trim panel with respect to the inner door panel. High attachment effort of the seal on to the inner door panel flange would hinder such manipulation.

In addition to meeting attachment and manipulation effort requirements, a door interior window seal must also be capable of fitting on the inner door panel flange securely. Variable thickness inner door panel flanges may cause a seal to fit improperly, thus decreasing the debris barrier and noise attenuation functions. Previous window seal designs had to trade off low insertion efforts, and more specifically the ability to properly align the interior trim panel with respect to the inner door panel, in order to have a seal that would securely hold the interior trim panel to the inner door panel flange.

What is desired than is a door interior window seal that facilitates attachment of the interior trim panel to the inner door panel flange via the seal, allows for low effort longitudinal adjustment of the interior trim panel relative to the inner door panel, and provides secure attachment of the interior trim panel to the inner door panel at the seal interface.

SUMMARY OF THE INVENTION

The present invention overcomes the disadvantages of the related art by providing an interior window seal having a pair of substantially parallel trim panel fingers adapted to receive a trim panel therebetween and a pair of substantially parallel flange fingers adapted to receive an inner door panel flange therebetween, the flange fingers adapted to rotate between a flange non-contacting position and a flange contacting position, thereby allowing for longitudinal movement of the seal relative to the flange when in the non-contacting position and preventing movement of the seal relative to the flange when in the contacting position.

An object of the present invention is to provide a door interior window seal that facilitates attachment of the interior trim panel to the inner door panel flange via the seal while allowing for low effort longitudinal adjustment of the interior trim panel, relative to the inner door panel, as well as secure attachment of the interior trim panel to the inner door panel at the seal interface.

An advantage of the present invention is that seal is rotatable between a flange non-contacting position and a flange contacting position, thereby providing for longitudinal movement of the seal relative to the flange when in the non-contacting position and preventing movement of the seal relative to the flange when in the contacting position.

BRIEF DESCRIPTION OF THE DRAWINGS

Other features and advantages of the present invention will become apparent to those skilled in the related arts upon reading the following description with reference to the accompanying drawings, in which.

DETAILED DESCRIPTION OF THE PREFERRED EMBODIMENT

Figure 1:
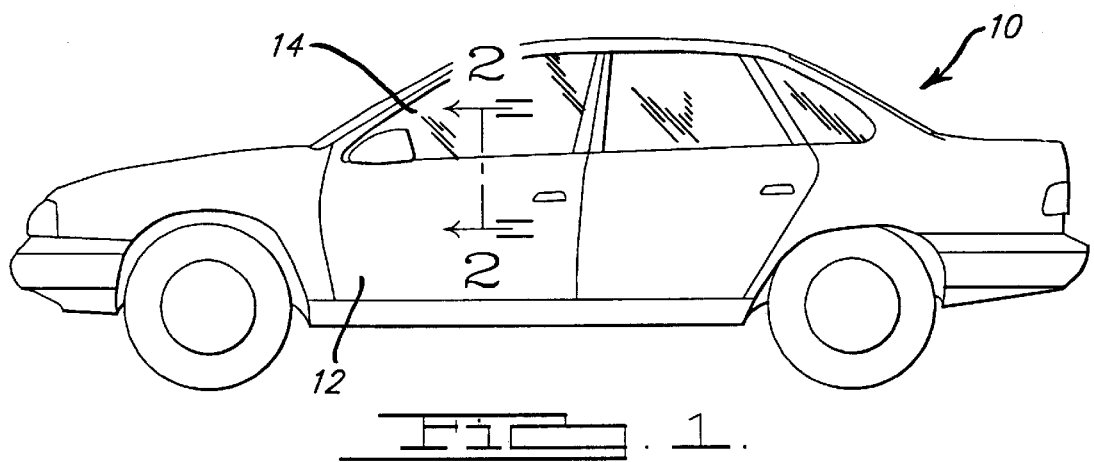
FIG. 1 is a side view of an automotive vehicle according to the present invention.
Figure 2:
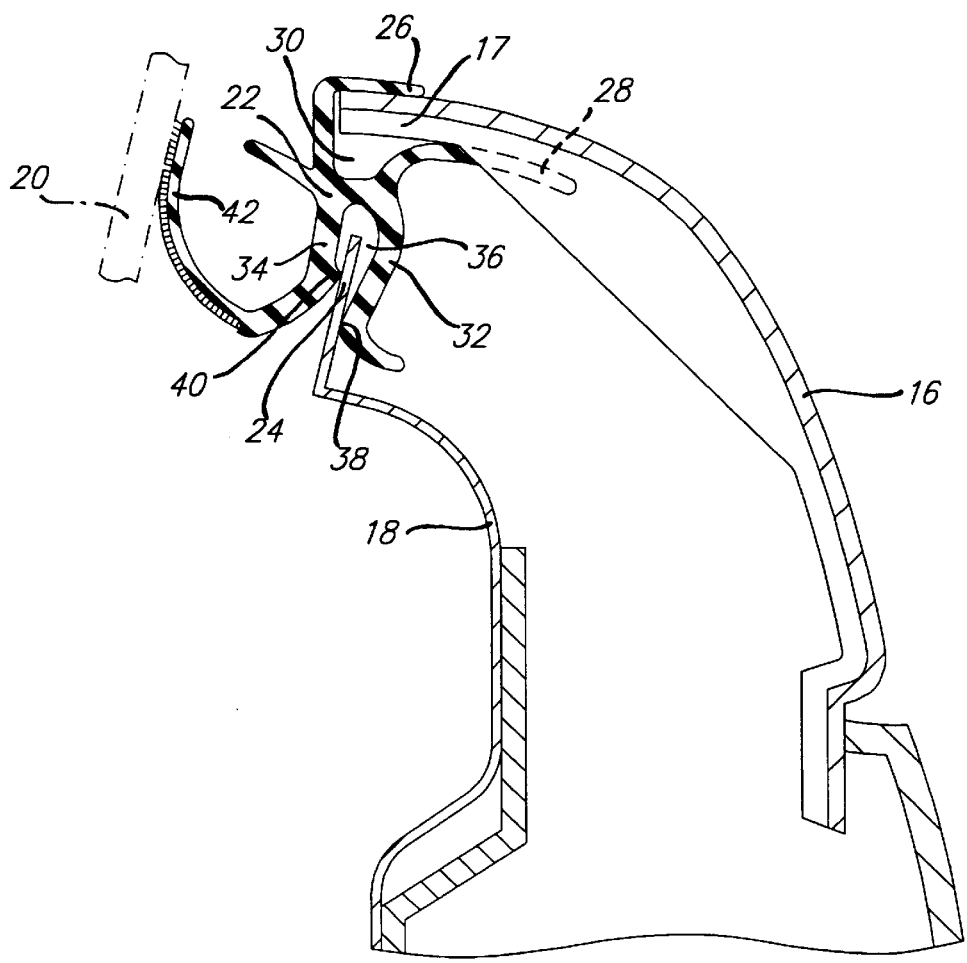
FIG. 2 is a sectional view taken along the line 2—2 of FIG. 1 showing an interior seal in a contacting relationship with an inner door panel according to the present invention.

Turning now to the drawings, and in particular to FIG. 1 thereof, an automotive vehicle 10 is shown having a side door 12. As shown in FIG. 2, a cross section of the vehicle side door 12 at the window 14 interface shows the door 12 having an interior trim panel 16, an inner door panel 18, a side door window 20, and an interior window seal 22. The interior trim panel 16 has an upper edge 17 and is typically made of a polymeric material. The inner door panel 18 has a seal mounting flange 24 and is a conventional sheet metal stamping as known in the art. The flange 24 may stand alone as part of the inner door panel 18 or may be one side of a two part flange mating against a corresponding outer door panel flange (not shown). The window 20 is translatable vertically between the inner 18 and outer door panels.

The seal 22 has an upper and lower finger, 26 and 28 respectively, forming a trim panel channel 30 therebetween. The upper edge 17 of the interior trim panel 16 is received in the channel 30. Preferably the upper edge 17 is rigidly fastened within the channel 30 by a sonic weld, heat stake, or any rigid attachment technique as known in the art. The seal 22 further has inner and outer fingers, 32 and 34 respectively, forming a door panel channel 36 therebetween. The flange 24 of the inner door panel 18 is adapted to be received in the channel 36. Each inner and outer finger, 32 and 34 respectively, has a flange engaging surface, 38 and 40 respectively, adapted to frictionally engage the flange 24. A curvilinear finger extension 42 projects from the outer finger 34. The extension 42 maintains contact with the window 14 and thereby prevents debris from contaminating the inner door panel 18 as well as preventing noise from entering the passenger compartment.

Figure 3:
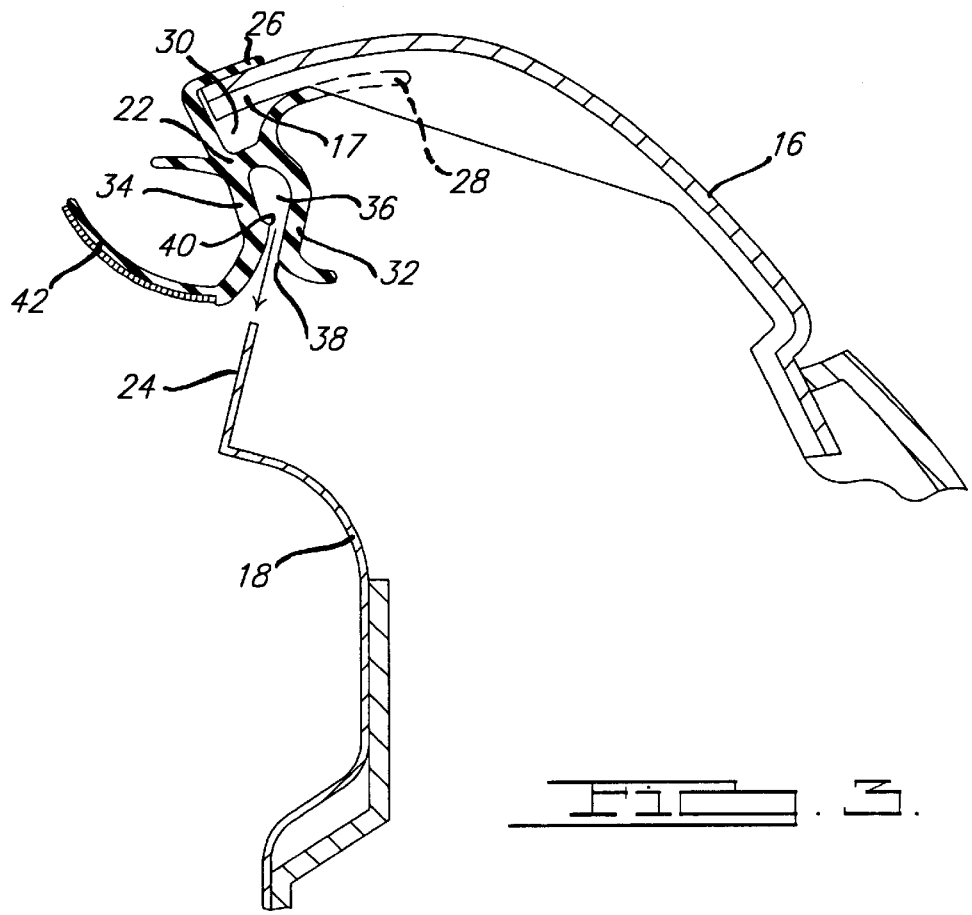
FIG. 3 is a sectional view taken along the line 2—2 of FIG. 1 showing an interior seal prior to engagement with an inner door panel according to the present invention.
Figure 4:
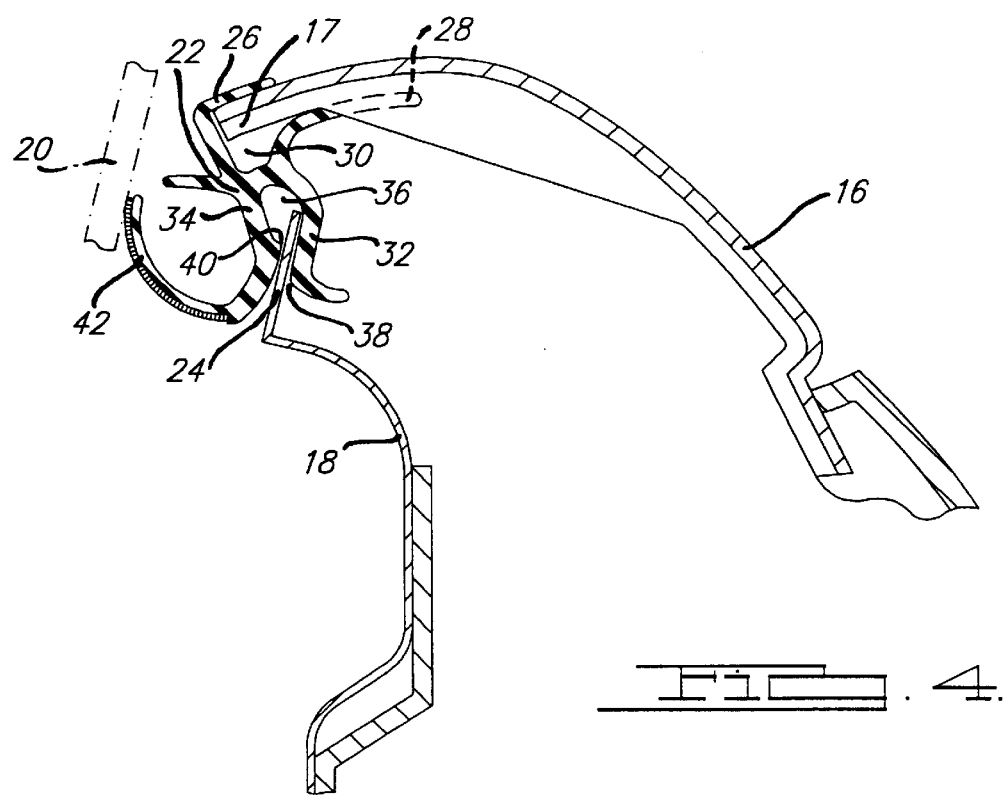
FIG. 4 is a sectional view taken along the line 2—2 of FIG. 1 showing an interior seal in engagement with, but in a non-contacting relationship relative to an inner door panel according to the present invention.

In assembly, the flange fingers 34 and 36 of seal 22 are aligned in substantially parallel relationship with and adjacent to the flange 24, as is shown in FIG. 3. As shown in FIG. 4, the flange channel 36 receives the flange 24 upon sliding the fingers 34 and 36 over the flange 24. As further shown in FIG. 4, the flange 24 is received within the channel 36 in a non-contacting relationship with respect to the fingers 34 and 36. This non-contacting relationship allows the seal 22, and correspondingly the interior trim panel 16, to be translated along the flange 24 in non-frictional fashion. As is shown in FIG. 2, the seal 22 and interior trim panel 16 are rotated to bring the flange engaging surfaces 38 and 40 of the fingers 32 and 34 in to a contacting relationship with the flange 24. This contacting relationship serves to lock the seal 22 to the flange 24 and prevent movement of the seal 22 with respect to the flange 24.

The present invention is advantageous in that the seal 22 is rotatable between a flange 24 non-contacting position and a flange contacting position, thereby providing for longitudinal movement of the seal 22 relative to the flange 24 when in the non-contacting position and preventing movement of the seal 22 relative to the flange 24 when in the contacting position. More specifically, these advantages facilitate attachment of the interior trim panel 16 to the inner door panel flange 24 via the seal 22 by providing for low effort longitudinal adjustment of the interior trim panel 16 relative to the flange 24. Further, secure attachment of the interior trim panel 16 to the inner door panel 18 at the seal 22 interface is provided by rotating the seal 22 in to the contacting position thereby preventing disengagement of the seal 22 from the flange 24 during window 20 operation.

Only one embodiment of the interior window seal 22 of the present invention has been described. Those skilled in the automotive arts will appreciate that others may be possible without departing from the scope of the following claims.

We claim:

1. An automotive vehicle door interior window seal apparatus in combination with a door having a sheet metal inner door panel with a seal mounting flange and an interior trim panel, the interior window seal comprising:

a pair of substantially parallel trim panel fingers forming a trim panel receiving channel rigidly attached to an upper edge of said trim panel;

a pair of flange fingers forming a flange receiving channel receiving said seal mounting flange; and locking means allowing said interior window seal and said interior trim panel to rotate from a non-contacting position wherein said interior window seal and said interior trim panel can be adjusted longitudinally along said seal mounting flange moved relative to said inner door panel to a contacting position wherein said interior window seal and said interior trim panel frictionally lock onto said door inner panel, thereby preventing movement of said interior window seal and said interior trim panel.

2. An automotive vehicle door interior window seal according to claim 1, wherein the pair of flange fingers further has a window contacting portion extending from one of the fingers, said window contacting portion forming a barrier between a passenger compartment and a inner door panel.

* * * * *